United States Patent [19]

Keiper

[11] Patent Number: 4,563,629
[45] Date of Patent: Jan. 7, 1986

[54] BATTERY RECHARGING CIRCUIT WITH INDICATOR MEANS

[75] Inventor: R. Steven Keiper, Raleigh, N.C.

[73] Assignee: Black & Decker Inc., Newark, Del.

[21] Appl. No.: 531,632

[22] Filed: Sep. 13, 1983

[51] Int. Cl.$^4$ .............................................. H02J 7/04
[52] U.S. Cl. ........................................ 320/48; 320/2; 340/636
[58] Field of Search ................ 320/2, 48, DIG. 1; 340/636

[56] References Cited

U.S. PATENT DOCUMENTS

| | | | |
|---|---|---|---|
| 3,189,788 | 6/1965 | Cady | 320/48 |
| 3,825,740 | 7/1974 | Friedman et al. | |
| 3,829,676 | 8/1974 | Nelson et al. | 320/28 |
| 3,890,555 | 6/1975 | Nelson et al. | 320/2 |
| 3,974,441 | 8/1976 | Van Der Haak | 320/48 |
| 4,045,663 | 8/1977 | Young | |
| 4,056,765 | 11/1977 | Scheidler et al. | 340/636 |
| 4,115,842 | 9/1978 | Keller | 362/183 |
| 4,177,500 | 12/1979 | Nicholl et al. | 362/20 |
| 4,228,484 | 10/1980 | Johnstone | 362/184 |

*Primary Examiner*—Peter S. Wong
*Assistant Examiner*—Anita M. Ault
*Attorney, Agent, or Firm*—Finnegan, Henderson, Farabow, Garrett & Dunner

[57] ABSTRACT

A recharging circuit including a diode and a battery serially connected and coupled in parallel to a power source includes (a) a first indicator connected across the power source and illuminated by a charging current delivered by the power source; (b) a second indicator connected between the power source and the junction of the battery and diode, and which is illuminated by discharge current delivered by the battery in the absence of charging current from the power source, and (c) a transistor coupled across the power source and to the second indicator, and being biased by charging current so as to prevent illuminated of the second indicator. The recharging circuit is included in a rechargeable flashlight and the first and second indicators are formed by a single bi-color light emitting diode.

14 Claims, 1 Drawing Figure

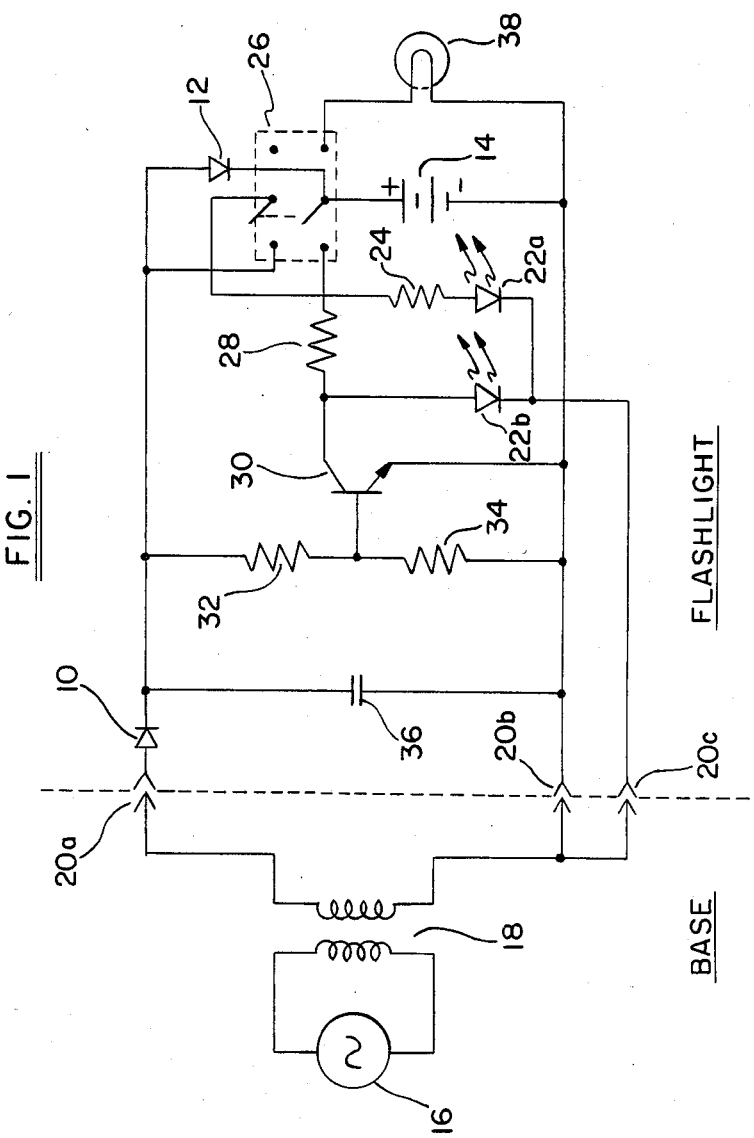

BATTERY RECHARGING CIRCUIT WITH INDICATOR MEANS

BACKGROUND OF THE INVENTION

1. Field of the Invention

The present invention relates to a battery recharging circuit and, more particularly, to a rechargeable flashlight having a dual indicator light for indicating the presence and absence of a charging current.

2. The Prior Art Rechargeable batteries, such as those comprising nickel and cadmium, commonly referred to as a "Ni-Cad", have long been known in the art. Corresponding circuits suitable for recharging such batteries have likewise been developed and widely used. Typically, these prior art circuits operate from a convenient power source, such as household 117 VAC, and include rectifying means, such as a diode or diode bridge, for developing a charging current that is applied to the battery to effect recharging.

It has also been recognized as useful to provide means for indicating that recharging is being successfully carried out by the recharging circuit. For example, a lightbulb driven by the charging circuit has been employed for such purposes. In applications in which a battery is being continuously charged, such as emergency lighting systems or household appliances conveniently readied for immediate use, it is also useful to provide means for indicating absence of charging current due, for example, to failure of the charging circuit. In the case of household appliances, such as rechargeable flashlights, this latter indicating means can be of help in allowing the flashlight to be quickly located in the event of a power failure and, hence, interruption of the charging current.

A battery recharging circuit with indicator lights as disclosed in Nelson et al., U.S. Pat. No. 3,890,555, includes means for indicating both a "CHARGE" condition and a "POWER OFF" condition. The disclosed indicator circuit includes a pair of cross-coupled transistors having a common current limiter, and a separate light emitting diode connected in series with the collector-emitter current path of each transistor. The two transistors are turned on alternately by the charging current or, in the case of failure of the power source, by current discharged by the battery. Driving these two transistors, particularly in the event of a power failure, causes an additional amount of current to be drawn from the battery in excess of the current needed to illuminate the "POWER OFF" indicator. Accordingly, the battery drains faster than is necessary which results in reduced battery charge if the flashlight is to be used and/or abbreviated illumination of the "POWER OFF" indicator. The presence of the cross-coupled transistors also means additional parts necessary for construction of the device, thus raising the costs, both of inventory and labor, associated with the circuit, as well as increasing the number of components subject to failure in the field.

SUMMARY OF THE INVENTION

Accordingly, it is an object of the invention to provide a battery recharging circuit including means for indicating the presence and absence of a charging current, i.e., "CHARGE" and "POWER FAILURE" indicators.

Another object of the present invention is for the battery to drive only the "POWER FAILURE" indicator and not any additional transistors, so that battery life can be conserved in the event of failure of the charging current.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purposes of the invention, as embodied and broadly described herein, a recharging circuit including diodes and a battery serially connected and coupled in parallel to a power source, comprises: first means connected across the power source for indicating the presence of a charging current delivered by the power source; second means connected between the power source and the junction of the diode with the battery for indicating the presence of a discharge current delivered by the battery; and a transistor coupled across the power source and to the second indicating means, the transistor being biased by the charging current to prevent energization of said second indicating means.

The accompanying drawing, which is incorporated in and constitutes a part of this specification, illustrates one embodiment of the invention and, together with the description, serves to explain the principles of the invention.

BRIEF DESCRIPTION OF THE DRAWING

The FIGURE is a schematic diagram of a recharging circuit in accordance with the present invention.

DESCRIPTION OF THE PREFERRED EMBODIMENT

Reference will now be made in detail to a presently preferred embodiment of the invention, an example of which is illustrated in the accompanying drawing.

In accordance with the present invention, a recharging circuit includes a diode and a battery serially connected and coupled in parallel to a power source. As embodied herein, the diode, battery and power source include, respectively, diode 12, battery 14 and power source 16 coupled to transformer 18. Power source 16 is preferably a conventional 117 VAC power main, such as that typically found in American households, although other sources and voltages may be employed as may be convenient. Power source 16 is connected to the primary winding of transformer 18 so that a stepped-down voltage suitable for application to a flashlight battery is produced at the transformer's secondary winding. It should be appreciated, however, that the arrangement and even the use of transformer 18 may be varied depending upon the particular power source 16 which is employed, as well as the battery to be recharged, all without departing from the spirit or scope of the present invention.

Diode 12 and battery 14 are serially connected together and are further coupled across the secondary winding of transformer 18. A second diode 10 may be provided in series between transformer 18 and diode 12 to provide further rectification of the power delivered by the transformer. Connection to transformer 18 is accomplished via a set of connectors 20a, 20b and 20c, as explained in further detail hereinbelow. Battery 14 is of a type capable of being recharged, such as a Ni-Cad battery. Although for purposes of illustration battery 14 is depicted as having two cells, the present invention may be used with a single cell battery, as well as with multiple batteries which have been serially connected.

Also in accordance with the invention, first means connected across the power source are provided for indicating the presence of a charging current delivered by the power source. As embodied herein, the first indicating means includes a serially connected light emitting diode (LED) 22a and a current limiting resistor 24. As explained in further detail hereinbelow, LED 22a may be referred to as the "CHARGE" indicator as it is illuminated, emitting a particular color, to indicate the presence of a charging current from the power source and, hence, the charging of battery 14. Although the first indicating means has been illustrated as including an LED and limiting resistor, it is also within the scope of the invention to instead employ other suitable indicators, such as a lightbulb, liquid crystal display or the like. LED 22a and resistor 24 of the first indicating means are connected to one side of a double pole double throw switch 26 such that switch 26 can selectively decouple the first indicating means from the power source.

According to the present invention, second means connected between the power source and the junction of the diode 12 with said battery are provided for indicating the presence of a discharge current delivered by the battery. As embodied herein the second indicating means includes a light emitting diode (LED) 22b serially connected to a current limiting resistor 28, and being further coupled between the junction of diode 12 and battery 14, and the secondary winding of transformer 18. As explained in further detail hereinbelow, LED 22b may be referred to as the "POWER FAILURE" indicator as it is illuminated, emitting a different color, to indicate the absence of charging current from the power source and, hence, the discharging of battery 14. Although the second indicating means has been illustrated as including an LED and limiting resistor, it is also within the scope of the invention to instead employ other suitable indicators, such as a lightbulb, liquid crystal display or the like.

The other side of switch 26 is coupled to battery 14 and the second indicating means such that the switch can selectively decouple the second indicating means from the battery 14. Thus, switch 26 serves to selectively decouple, i.e. disable, both indicating means.

In accordance with the present invention, a transistor coupled across the power source and to the second indicating means is provided, said transistor being biased by the charging current to prevent the energization of the second indicating means. As embodied herein, the transistor, which is identified by reference character 30, has a base and an emitter coupled across the secondary winding of transformer 18, and a collector coupled to the second indicating means at the junction between LED 22b, and resistor 28.

More particularly, transistor 30 is coupled across transformer 18 by means of a voltage divider comprising resistors 32 and 34. The resistors are serially connected across the secondary winding of transformer 18 with the base of transistor 30 being coupled to the junction between the resistors. The base of transistor 30 thus receives, in a well-known manner, a voltage less than that present across the secondary winding of transformer 18.

A recharging circuit according to the present invention further includes a filter capacitor 36 coupled across the secondary winding of transformer 18 such that rectifying diode 10 is coupled in series with a loop formed by the secondary winding of transformer 18 and filter capacitor 36. A lightbulb 38 is also provided coupled across battery 14 via switch 26. Lightbulb 38, battery 14 and the corresponding portions of switch 26 together define a flashlight in a well-known manner.

According to a presently preferred embodiment, the invention is housed in two separate parts as delineated by the dotted line in the FIGURE. The elements to the right of the dotted line are contained within a common housing, such as a flashlight body, while the elements to the left of the dotted line are contained in a separate housing, referred to as a "base". The base, which includes transformer 18, may conveniently be provided with a plug (not shown) adapted for connection to a common wall socket (not shown) for coupling with AC power means 16. The base is provided with one half of each of connectors 20a, 20b and 20c, the a corresponding half of each connector being provided in the flashlight housing. Furthermore, according to a presently preferred embodiment, the halves of connectors 20b and 20c which are located in the base are combined into a single male contact received simultaneously by two female contacts corresponding, respectively, to the halves of contacts 20b and 20c located in the flashlight portion. Thus, the flashlight may readily be coupled to the base such that the corresponding halves of connectors 20a, 20b and 20c are engaged and the circuit completed.

The operation of the present invention will now be explained in detail. There are three principal modes of operation of the present invention, and each will be explained in order hereinbelow. First, with the flashlight engaged with the base, recharging of battery 14 is accomplished while "CHARGE" LED 22a is illuminated in one color. Second, also with the flashlight connected with the base, failure of power source 16 has occurred such that charging of battery 14 is discontinued and "POWER FAILURE" LED 22b is illuminated in an alternate color. The third mode of operation concerns normal usage of the flashlight, i.e., removing the flashlight from the base and the coupling of battery 14 so as to illuminate lightbulb 38.

In the following discussion of the first mode of operation, namely charging of battery 14, it is necessary that switch 26 be closed, i.e. the switch arm is moved to the contacts to the left as viewed in the FIGURE. In this mode of operation, an AC voltage is delivered by power source 16 to transformer 18 so that a stepped-down AC voltage is present on the secondary winding of the transformer. The stepped-down voltage is half-wave rectified by diode 10 and the resulting DC voltage is filtered by capacitor 36. Charging current flowing from diode 10 through switch 26 and resistor 24 causes energization of LED 22a, thereby resulting in a "CHARGE" indication. This current also flows through diode 12 and to battery 14, thus causing recharging of the battery in a known fashion. Additionally, the voltage across the voltage divider formed by resistors 32 and 34 causes transistor 30 to be biased on, thus lowering the potential of the collector of transistor 30 which keeps LED 22b off. Accordingly, the "POWER FAILURE" indicator formed by LED 22b cannot be energized in the presence of charging current emanating from power source 16.

In the second mode of operation, namely failure of power source 16, switch 26 is configured in the same manner as in the first mode. Upon failure of power source 16, the charging current is discontinued so that "CHARGE" LED 22a is no longer illuminated. Furthermore, transistor 30 is turned off since no charging current is available to continue to bias it on. Instead, discharge current from battery 14 flows through resistor 28 and LED 22b, thereby energizing the latter and resulting in illumination of the "POWER FAILURE" indicator. Since diode 12 is connected in the reverse direction with respect to the discharge current, LED 22a cannot inadvertently be illuminated by battery 14.

It can be appreciated from the foregoing that in this second mode of operation, the battery is called upon to drive only LED 22b through resistor 28. That is, the discharge current from the battery is not used to bias on a switching transistor, as in prior art devices. Battery 14 thus discharges at a slower rate as compared to prior art devices, and can illuminate the "POWER FAILURER" indicator for a longer period of time.

In the third mode of operation, namely normal use of the flashlight, switch 26 is opened, i.e., the switch arm is moved to the right as viewed in the FIGURE, so as to provide connection between battery 14 and lightbulb 38. In so doing, both portions of LED 22a and 22b are disabled whereas lightbulb 38 is illuminated in a conventional manner. Although in this mode of operation the flashlight has most likely been removed from the base for convenience use, it is to be understood that the flashlight will operate conventionally in this mode even if still coupled to the base via connectors 20a, 20b and 20c. In decoupling the flashlight from the base, the cathodes of LEDs 22a and 22b are disconnected from the rest of the circuitry due to connector 20c. Thus, once the flashlight is removed from the base, both LEDs are rendered inoperative.

According to a preferred embodiment of the invention, LEDs 22a and 22b together comprise a bi-color LED such as type "CQX 95" available from AEG-TELEFUNKEN of Somerville, New Jersey. Such devices comprise two LEDs of different colors, such as red and green, in a single package with the cathodes of the LEDs being connected together to a common lead. In the presently preferred embodiment, LED 22a comprises the red portion of the bi-color LED whereas LED 22b comprises the green portion of the bi-color LED. It is to be understood, however, that other arrangements and various types of LEDs or indicators may be used without departing from the spirit or scope of the present invention.

Also according to a presently preferred embodiment, switch 26 comprises a unitary double pole double throw switch, although other switching arrangements may be utilized without departing from the scope or spirit of the invention. For sake of clarity, it is noted that one contact (shown in upper right corner of dotted lines) of the double throw portion of switch 26 is left unconnected.

It will be apparent to those skilled in the art that modifications and variations can be made in the recharging circuit of this invention. The invention in its broader aspects is, therefore, not limited to the specific details representative apparatus and illustrative examples shown and described. Thus, it is intended that all matter contained in the foregoing description or shown in the accompanying drawing shall be interpreted as illustrative and not in a limiting sense.

What is claimed is:

1. A recharging circuit including a diode and a battery serially connected and coupled in parallel to a power source, comprising:
   first means connected across said power source for indicating the presence of a charging current delivered by the power source;
   second means connected between said power source and the junction of said diode with said battery for indicating the presence of a discharge current delivered by said battery; and
   a transistor coupled across said power source and to said second indicating means, said transistor being biased on by said charging current to prevent energization of said second indicating means and being off in the absence of said current to permit energization of said second indicating means by said discharge current.

2. The battery recharging circuit of claim 1, wherein said transistor has a base, a collector and an emitter, said base and said emitter being coupled to said power source, and said collector being coupled to said second indicating means.

3. The battery recharging circuit of claim 1, wherein said transistor is coupled to said power source via a divider network comprising serially connected resistors coupled in parallel with said power source.

4. The battery recharging circuit of claim 1, wherein said first indicating means includes a serially connected light emitting diode.

5. The battery recharging circuit of claim 1, wherein said first indicating means includes a switch for selectively decoupling said first indicating means from said power source and for selectively decoupling said second indicating means from said battery.

6. The battery recharging circuit of claim 1, wherein said second indicating means includes a light emitting diode.

7. The battery recharging circuit of claim 1, further comprising a lightbulb and a switch connected in series across said battery, said lightbulb being selectively connected to said battery through said switch.

8. The battery recharging circuit of claim 1, wherein said first indicating means includes a first light emitting diode and said second indicating means includes a second light emitting diode, said first and second light emitting diodes together comprising a bi-color light emitting diode.

9. A recharging circuit with means for indicating the presence or absence of a charging current across a rechargeable battery connected in parallel with a power source, comprising:
   a power charging indicating circuit with means for indicating the absence of said charging circuit;
   a power failure indicating circuit with means for indicating the absence of said charging current; and
   a transistor coupled to said power failure indicator circuit and said power source, said transistor being biased on in the presence of said charging current thereby do-energizing said power failure indicator circuit, and being off in the absence of said charging current, said power failure indicator circuit thereby being energized by a current from said battery.

10. The recharging circuit of claim 9, wherein said power charging indicating circuit includes a serially connected light emitting diode and a resistor with the cathode of said diode being coupled to the power source, the anode of said diode being coupled to one end of said resistor and the other end of said resistor being coupled to the power source.

11. The recharging circuit of claim 9, wherein said power failure indicating circuit includes a serially connected light emitting diode and a resistor, all being coupled in parallel across said rechargeable battery, said light emitting diode having an anode and a cathode, and said battery having one positive and one negative terminal with the positive battery terminal being connected to one end of said resistor and the other end of said resistor being coupled to the anode of said light emitting diode, the cathode of said diode being connected to the negative terminal of said battery, such that battery current is provided to said diode.

12. The recharging circuit of claim 9, wherein said transistor has a base, a collector and an emitter, said base and said emitter being coupled to the power source, and said collector being coupled to said power failure indicating circuit.

13. The recharging circuit of claim 9, further comprising a diode connected in series between said power source and said rechargeable battery, said diode being back biased in the presence of a battery voltage, thereby ensuring that the battery current does not flow to the power source.

14. The recharging circuit of claim 9, further comprising a voltage divider network coupled across said power source, said voltage divider including two serially coupled resistors, and said transistor being coupled to said power source via said voltage divider network, whereby said voltage divider network provides a biasing voltage for turning on said transistor in the presence of a charging current from said power source.

* * * * *

UNITED STATES PATENT AND TRADEMARK OFFICE
CERTIFICATE OF CORRECTION

PATENT NO. : 4,563,629

DATED : January 7, 1986

INVENTOR(S) : R. Steven Keiper

It is certified that error appears in the above-identified patent and that said Letters Patent is hereby corrected as shown below:

In Claim 9, line 12, change "do-energizing" to --de-energizing--

Signed and Sealed this

Thirtieth Day of September 1986

[SEAL]

Attest:

DONALD J. QUIGG

Attesting Officer

Commissioner of Patents and Trademarks